(12) United States Patent
Liu et al.

(10) Patent No.: US 8,430,574 B2
(45) Date of Patent: Apr. 30, 2013

(54) OPTICAL FIBER CONNECTOR WITH REFERENCE HOLE

(75) Inventors: Hsu-Chih Liu, Tu-Cheng (TW); Wen-Yi Hsieh, Tu-Cheng (TW); Yen-Chih Chang, Tu-Cheng (TW)

(73) Assignee: Hon Hai Precision Ind. Co., Ltd, New Taipei (TW)

( * ) Notice: Subject to any disclaimer, the term of this patent is extended or adjusted under 35 U.S.C. 154(b) by 262 days.

(21) Appl. No.: 12/901,581

(22) Filed: Oct. 11, 2010

(65) Prior Publication Data

US 2011/0085762 A1 Apr. 14, 2011

(30) Foreign Application Priority Data

Oct. 12, 2009 (TW) .................................. 98218791

(51) Int. Cl.
*G02B 6/36* (2006.01)
(52) U.S. Cl.
USPC ............................................................. 385/74
(58) Field of Classification Search .................. None
See application file for complete search history.

(56) References Cited

U.S. PATENT DOCUMENTS

| | | | | |
|---|---|---|---|---|
| 4,119,362 | A * | 10/1978 | Holzman | 385/74 |
| 4,830,456 | A * | 5/1989 | Kakii et al. | 385/75 |
| 5,241,612 | A * | 8/1993 | Iwama | 385/74 |
| 5,917,976 | A * | 6/1999 | Yamaguchi | 385/88 |
| 7,985,026 | B1 * | 7/2011 | Lin et al. | 385/71 |
| 8,235,601 | B2 * | 8/2012 | Chang et al. | 385/74 |
| 2003/0016918 | A1 * | 1/2003 | Grabbe | 385/78 |
| 2006/0068629 | A1 * | 3/2006 | Nakajima | 439/378 |
| 2011/0008004 | A1 * | 1/2011 | Liao et al. | 385/74 |
| 2011/0222823 | A1 * | 9/2011 | Pitwon | 385/93 |
| 2011/0229083 | A1 * | 9/2011 | Dainese J nior et al. | 385/74 |

FOREIGN PATENT DOCUMENTS

| | | | | |
|---|---|---|---|---|
| JP | 63-85522 | A | * | 4/1988 |
| JP | 2-187717 | A | * | 7/1990 |

* cited by examiner

*Primary Examiner* — Mike Stahl
(74) *Attorney, Agent, or Firm* — Wei Te Chung; Ming Chieh Chang

(57) ABSTRACT

An optical fiber connector includes a mating portion defining a coupled direction and including pairs of lenses and a pair of guiding portions. The pair of guiding portions each defines a guiding hole through a front face thereof in the coupled direction. Each guiding hole has a cross section of a polygon shape in the coupled direction and is configured with an imaginary circle perpendicular to the coupled direction.

15 Claims, 5 Drawing Sheets

OPTICAL FIBER CONNECTOR WITH REFERENCE HOLE

BACKGROUND OF THE INVENTION

1. Field of the Invention

The present invention relates to an optical fiber connector with guiding holes to be inserted by guiding posts of a counter optical fiber connector.

2. Description of Related Art

Conventional optical fiber connector assembly general includes cylinder guiding holes and corresponding cylinder guiding posts which intend to be inserted in the cylinder guiding holes. Thus, an engagement of the connector assembly can be facilitate. Moreover, the accurate alignment of the posts in the holes ensures an accurate alignment of the lenses of the assembly, thereby reaching a best light transmission.

However, it is difficult to manufacture ideal cylinder guiding holes in injection molding process. It is a need to design a new connector to overcome said disadvantage.

SUMMARY OF THE INVENTION

An object of the present invention is to provide an optical fiber connector with an high accurate engagement of guiding holes thereof.

In order to achieve above-mentioned object, an optical fiber connector comprises a mating portion defining a coupled direction and comprising pairs of lenses and a pair of guiding portions. The pair of guiding portions each defines a guiding hole through a front face thereof in the coupled direction. Each guiding hole has a cross section of a polygon shape in the coupled direction and is configured with an imaginary circle perpendicular to the coupled direction.

Other objects, advantages and novel features of the present invention will become more apparent from the following detailed description of the present embodiment when taken in conjunction with the accompanying drawings.

DETAILED DESCRIPTION OF THE INVENTION

Figure 1:
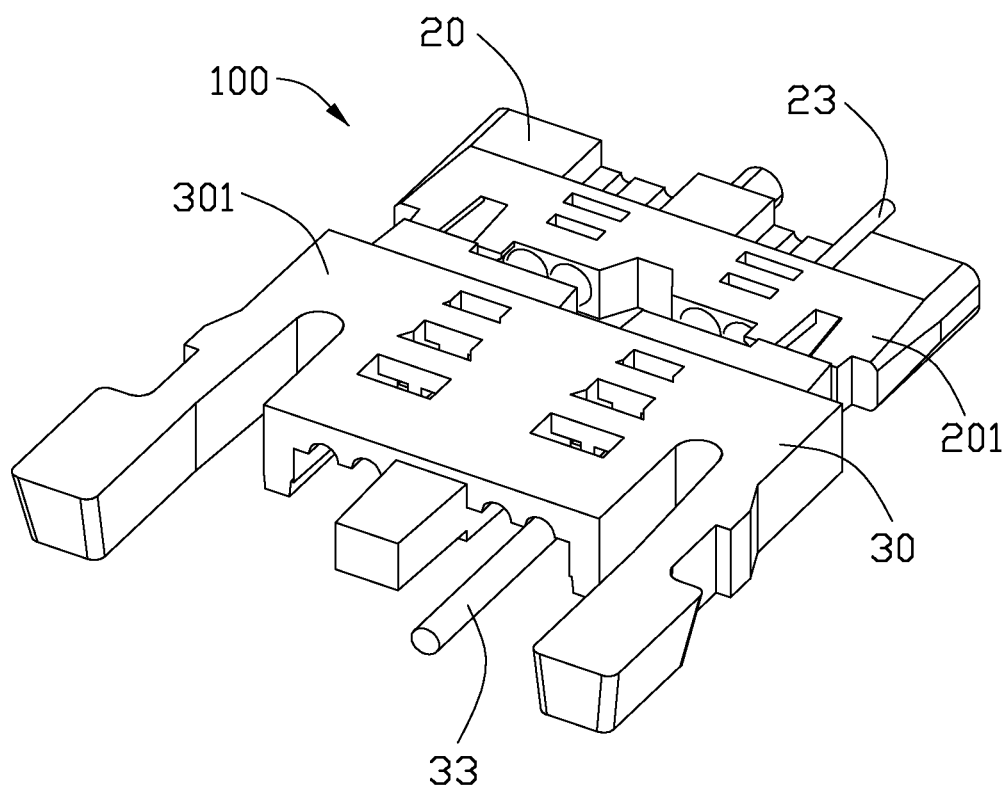
FIG. 1 is a perspective view of an optical fiber connector assembly with engaged first and second optical fiber connectors in accordance with the present invention.

Reference will now be made to the drawing figures to describe the preferred embodiment of the present invention in detail.

Referring to FIG. 1, an optical fiber connector assembly includes a first optical fiber connector 20 and a second optical fiber connector 30 mated with each other.

Figure 2:
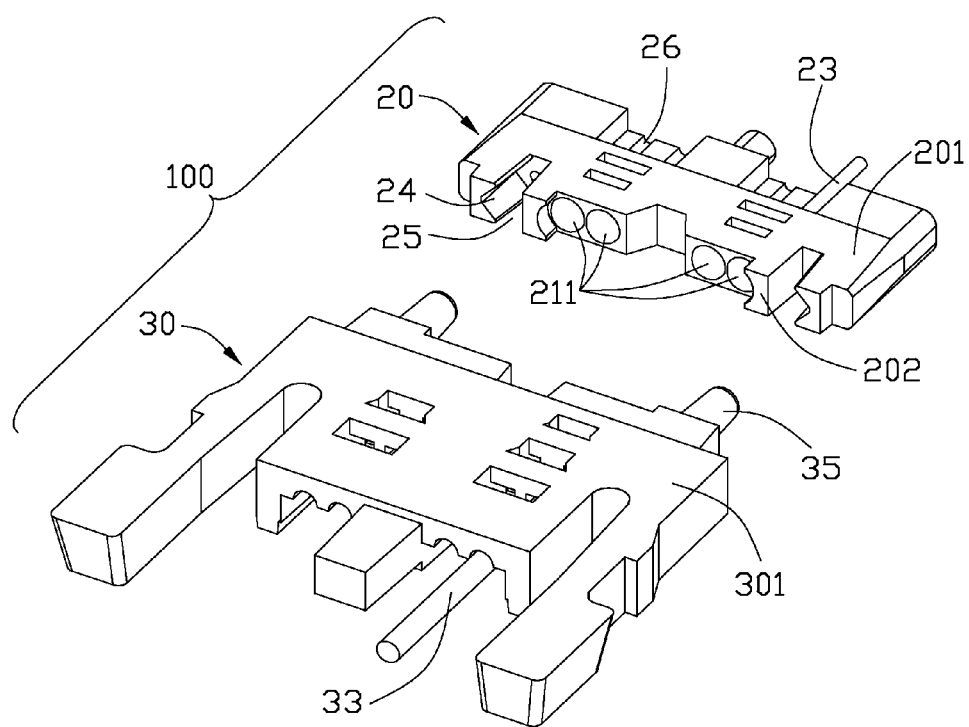
FIG. 2 is a perspective view of the optical fiber connector assembly with the disconnecting first and second optical fiber connectors.
Figure 3:
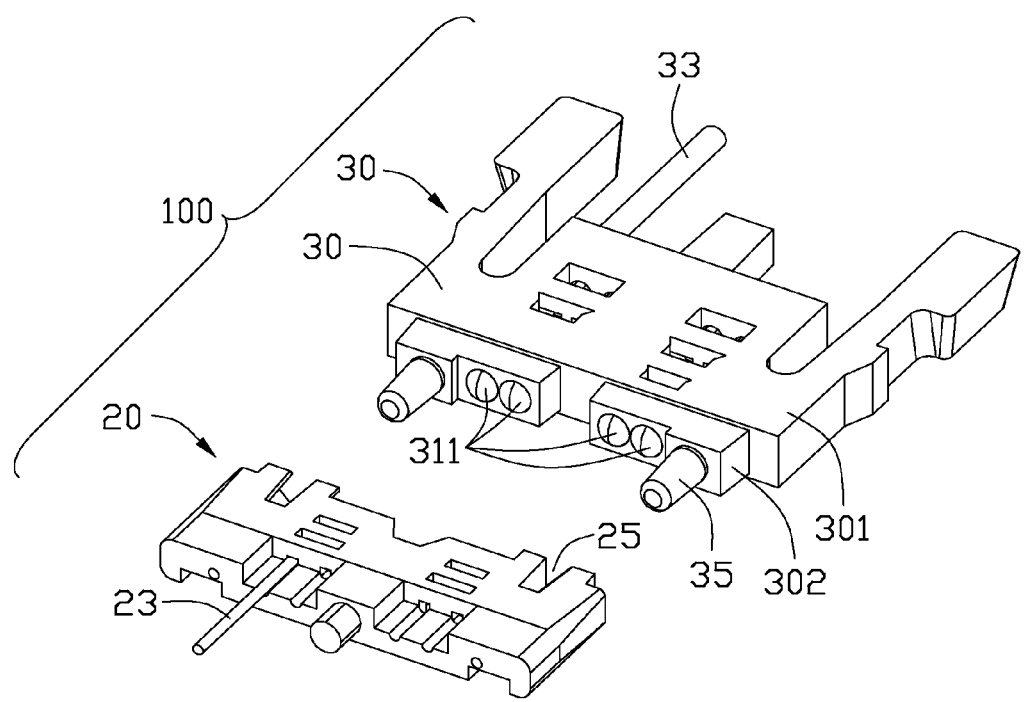
FIG. 3 is similar to FIG. 2 from a different view.

Referring to FIGS. 2 and 3, the first optical fiber connector 20 include an insulating housing 201 and a mating portion 202 defined at a front face of the insulating housing 201. The mating portion 202 includes two pairs of first lenses 211 at the front face thereof and two guiding portions 24 at opposite outer sides of and beyond the two pairs of lenses 211. Two pairs of recesses 26 are defined at a rear portion of the insulating housing 201, which are aligned with the lenses 211 one by one to receive corresponding optical fiber cables 23 (only one is shown in the drawing figures). The guiding portions 24 each includes a guiding hole 25.

The second optical fiber connector 30 includes an insulating housing 301 and a pair of mating portions 302 defined at a front face of the insulating housing 301. The mating portions 302 each includes a pair of lenses 311 and a cylinder guiding post 35 at an outer side of the pair of lenses 311 projecting forwards beyond the lenses 311. Four optical fiber cables 33 are retained at a rear portion of the insulating housing 301 under a condition that the cables 33 are aligned with the lenses 311 one by one. The first and second connector are mating with each other under a condition the cylinder guiding posts 35 are inserted in the guiding holes 25 and the lenses 211, 311 are coupled with each other to transmit light signals.

Figure 4:
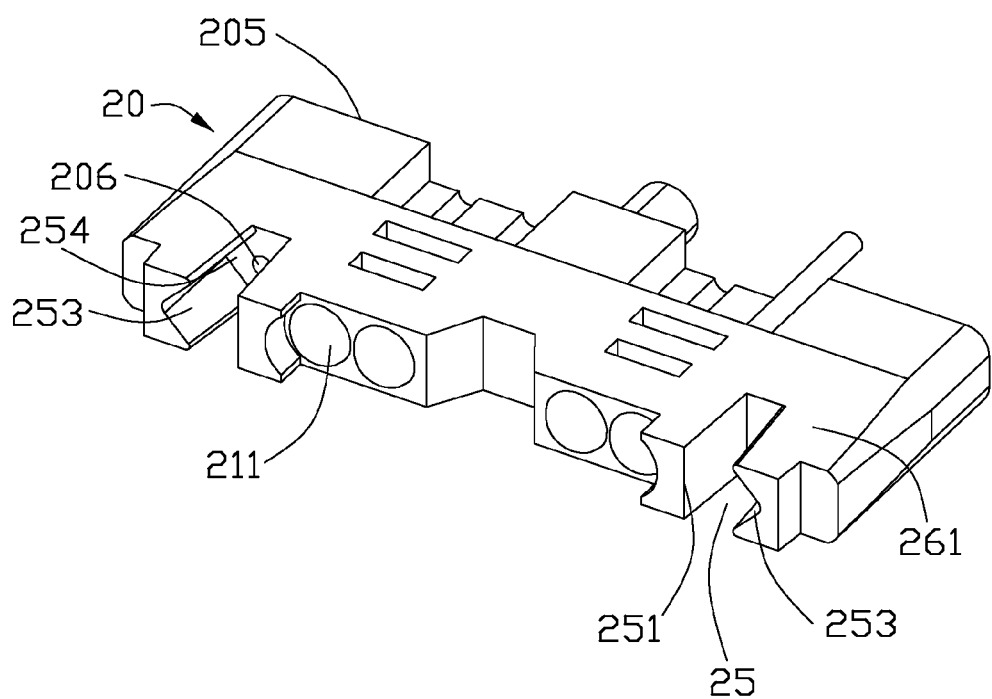
FIG. 4 is a perspective view of the first optical fiber connector in FIG. 2.
Figure 5:
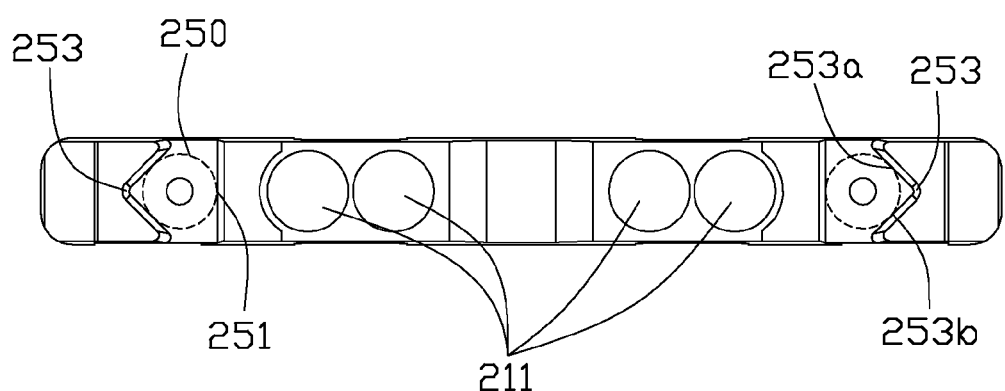
FIG. 5 is a front plane view of the first optical fiber connector.

FIGS. 4 and 5 show the construct of the guiding holes 25 and an engagement of the guiding holes and the guiding posts. The guiding holes 25 run through a front face, a top surface 261 and bottom surface opposite to the bottom face thereof, and extend rearward beyond the lenses 211 but not through the rear face 205. Each guiding hole 25 includes inner side faces 251, 253 and an inner bottom face 254 perpendicular to a coupled direction along which said two connectors mates with each other. The first inner side face 251 near to the lenses 211 is of vertical plane and intersects with the top surface 261 and the lower surface. The second inner side face 253 is formed by two intersected planes 253a, 253b as clearly shown in FIG. 5, and intersects with the top surface 261 and the lower surface. Said two intersected planes 253a, 253b opens to the first inner side face 251. The first and second inner side faces define three tips to form an imaginary circle 250 shown in broken line in FIG. 5, which has a circle centre correspondingly. Thus a reference hole 206 is defined at the inner bottom face 254 of the mating hole 25 aligned with the circle centre. The reference hole 206 can penetrate through or not the rear face 205 of the insulating housing. Alternatively, the inner side faces of the guiding holes can be other shapes just be sure that the inner side faces of the guiding holes can defines an imaginary circle 250. The guiding posts 35 of the second connector 30 are designed with a radius equal to or little smaller than the radius of the imaginary circle 250 to sure the guiding posts interference with the inner side face of the guiding holes.

The guiding holes 25 of the present invention has a cross section of a polygon shape in the coupled direction, a pentagon shape in the embodiment. It is easy to define a circle centre of an imaginary circle of the polygon shape compared with a circle shape of the guiding holes in the conventional art. In response that, the radiuses of the guiding posts of the second connector are facility to moderate to get an accurate engagement of the posts in the hole and the coupled lenses. The reference holes 206 are set for assisted positioning.

However, the disclosure is illustrative only, changes may be made in detail, especially in matter of shape, size, and arrangement of parts within the principles of the invention.

What is claimed is:

1. An optical fiber connector comprising:
   a mating portion defining a coupled direction and comprising pairs of lenses and a pair of guiding portions;
   the pair of guiding portions each defining a guiding hole through a front face thereof in the coupled direction;
   wherein each guiding hole has a cross section of a polygon shape in the coupled direction and is configured with an imaginary circle perpendicular to the coupled direction;

wherein the imaginary circle has a circle centre, thereby a reference hole is formed at a bottom face perpendicular to the coupled direction of the guiding hole, and the reference hole is aligned with the circle centre.

2. The optical fiber connector as described in claim 1, wherein inner side faces of the guiding holes is composed of opposite first side face and second side face, the first side face is of vertical plane and the second side face is formed by two intersecting plane.

3. The optical fiber connector as described in claim 2, wherein the first and second inner side face intersect with two opposite surfaces of the mating portion thereby the guiding holes penetrate said two opposite surfaces.

4. The optical fiber connector as described in claim 3, wherein the guiding holes extend rearwards beyond the lenses in the coupled direction.

5. An optical fiber connector comprising:
a mating portion defining a coupled direction and comprising pairs of lenses and a pair of guiding portions;
the pair of guiding portions each defining a guiding hole through a front face thereof in the coupled direction;
the guiding hole comprising an inner bottom face perpendicular to the coupled direction and inner side faces perpendicular to the inner bottom face;
wherein the inner side faces are provided with at least three planes under a condition an imaginary circle perpendicular to the coupled direction is defined inscribed with said three planes;
wherein a reference hole is formed at the inner bottom face which is aligned with a circle centre of the imaginary circle.

6. An optical fiber connector assembly comprising:
a first part and a second part mated with each other in an axial direction;
the first part defining a pair of guiding posts spaced from each other in a transverse direction perpendicular to said axial direction, each of said guiding posts essentially having a circular cross-section configuration thereof;
a plurality of first optical components associated with the first part;
the second part defining a pair of guiding holes spaced from each other in said transverse direction, each of said guiding holes adapted to receive the corresponding guiding post, said guiding hole defining a cross-section contour composed essentially by a plurality of linear segments; and
a plurality of second optical components associated with the second part for coupling to the corresponding first optical components, respectively;
wherein for each guiding hole, at least adjacent two of said linear segments are angularly symmetric relative to an imaginary horizontal center line which extends in the transverse direction and is defined by a center level of each of said guiding holes in a vertical direction perpendicular to both said transverse direction and said axial direction so as to have centers of said pair of guiding posts essentially comply with said horizontal center line, when mated in the axial direction;
wherein in each of said guiding holes, said linear segments further includes a vertical segment which extends in the vertical direction and is located opposite to said at least adjacent two segments in the transverse direction and is divided by said horizontal center line into two equal halves.

7. The optical fiber connector assembly as claimed in claim 6, wherein said cross-sectional contour is wholly formed by said linear segments without involvement of any curved segments.

8. The optical fiber connector assembly as claimed in claim 6, wherein said cross-sectional contour is essentially of a polygon with two side openings extending through corresponding opposite exterior surfaces of the second part in the vertical direction.

9. The optical fiber connector assembly as claimed in claim 8, wherein said polygon is a regular polygon with an imaginary inscribed circle therein under condition that a center of said imaginary inscribed circle complies with said horizontal center line.

10. The optical fiber connector assembly as claimed in claim 6, wherein in each of said guiding holes, said adjacent two segments and said vertical segment commonly define an imaginary triangle with an imaginary inscribed circle under condition that a center of said imaginary inscribed circle complies with said horizontal center line.

11. The optical fiber connector assembly as claimed in claim 6, wherein pair of guiding holes are essentially identical with each other while arranged in a symmetrical manner with regard to a vertical center line of the second part.

12. The optical fiber connector assembly as claimed in claim 11, wherein in each of said guiding holes, said adjacent two segments are located on an outer side, in the transverse direction, compared with the remaining segments.

13. The optical fiber connector assembly as claimed in claim 6, wherein each of said guiding holes defines a diverging configuration toward an opening while each of said guiding posts defines a converging configuration toward a distal end.

14. The optical fiber connector assembly as claimed in claim 8, wherein said cross-section contour is of a home plate configuration.

15. The optical fiber connector assembly as claimed in claim 10, wherein a reference hole is formed in a bottom face of the guiding hole and located at the center of said imaginary inscribed circle.

* * * * *